(12) United States Patent
Chen

(10) Patent No.: US 6,917,515 B2
(45) Date of Patent: Jul. 12, 2005

(54) ELECTRICAL COMPONENT HAVING A HOUSING RETAINED IN A RECEIVING GROOVE IN A SUPPORT THROUGH A RETAINING DEVICE

(75) Inventor: David Chen, Taipei (TW)

(73) Assignee: Kita Sensor Tech. Co., Ltd., Taipei (TW)

( * ) Notice: Subject to any disclaimer, the term of this patent is extended or adjusted under 35 U.S.C. 154(b) by 164 days.

(21) Appl. No.: 10/423,874

(22) Filed: Apr. 28, 2003

(65) Prior Publication Data

US 2004/0212952 A1 Oct. 28, 2004

(51) Int. Cl.[7] .............................. H05K 5/00; H05K 7/00
(52) U.S. Cl. ...................... 361/679; 361/600; 361/621; 92/5 R
(58) Field of Search .................................. 361/678, 679, 361/683, 600–605; 324/207.2–207.24, 262; 340/539.23, 680.1; 92/5 R, 240–256, 163, 164, 169.1, 151, 508, 533, 628; 91/361, 363 R; 200/82 E, 81.9 M, 294, 293, 296, 295; 116/267

(56) References Cited

U.S. PATENT DOCUMENTS

| | | | | |
|---|---|---|---|---|
| 3,639,868 A | * | 2/1972 | Gasper et al. ............... | 335/205 |
| 5,290,981 A | * | 3/1994 | Yuda .......................... | 200/296 |
| 5,335,587 A | * | 8/1994 | Stoll .......................... | 92/169.2 |
| 5,438,911 A | * | 8/1995 | Fiedler et al. ................ | 92/5 R |
| 5,552,302 A | * | 9/1996 | Lewis et al. ............... | 435/69.2 |
| 5,662,022 A | * | 9/1997 | Stoll .......................... | 92/5 R |
| 5,813,313 A | * | 9/1998 | Stoll et al. .................... | 92/5 R |
| 6,101,920 A | * | 8/2000 | Leonhardt .................... | 92/5 R |
| 6,755,115 B2 | * | 6/2004 | Stoll et al. ................ | 91/363 R |
| 6,828,782 B2 | * | 12/2004 | Nagai et al. ........... | 324/207.24 |

* cited by examiner

*Primary Examiner*—Michael Datskovskiy
(74) *Attorney, Agent, or Firm*—Davidson Berquist Jackson & Gowdey, LLP

(57) ABSTRACT

An electrical component has a housing received in a receiving groove, which is confined by opposite lateral walls connected to a groove bottom, formed in a support. A retaining device includes a base extending from one end of the housing and disposed on the groove bottom of the receiving groove, an engaging block confined non-rotatably in the receiving groove and disposed between the base and opposite stop protrusions that are formed respectively on the lateral walls and that cooperate to form a restricted access into the receiving groove, and a fastener extending rotatably through a through hole in the engaging block and coupled rotatably to the base. Operation of the fastener can drive the engaging block to move to an engaging position, where the engaging block abuts against the stop protrusions and where the fastener urges the base toward the groove bottom.

3 Claims, 6 Drawing Sheets

ELECTRICAL COMPONENT HAVING A HOUSING RETAINED IN A RECEIVING GROOVE IN A SUPPORT THROUGH A RETAINING DEVICE

BACKGROUND OF THE INVENTION

1. Field of the Invention

The invention relates to an electrical component, more particularly to an electrical component having a housing retained in a receiving groove in a support through a retaining device.

2. Description of the Related Art

FIGS. 1 to 3 illustrate a conventional magnetic induction switch 91 mounted on a fluid cylinder 92. The fluid cylinder 92 is provided with a piston 94 therein. The piston 94 is provided with a magnet member 941 such that the conventional magnetic induction switch 91 can be excited so as to generate a control signal in response to movement of the piston 94. The fluid cylinder 92 has a surface formed with an elongated receiving groove 93 that is confined by a groove bottom 932 and opposite lateral walls 933. Each lateral wall 933 is formed with an elongated stop protrusion 931. The stop protrusions 931 on the lateral walls 933 cooperate to form a restricted recess into the receiving groove 93.

The conventional magnetic induction switch 91 includes a housing 90 formed with a threaded hole 96 adjacent to one end 902 thereof. A bolt 95 extends rotatably through the threaded hole 96 so as to drive the housing 90 to move along the bolt 95 from a disengaging position, where the housing 90 is disposed on the groove bottom 932 and is disposed to be spaced apart from the stop protrusions 931 (see FIG. 2), to an engaging position, where the housing 90 abuts against the stop protrusions 931 and is disposed to be spaced apart from the groove bottom 932 (see FIG. 3). It is noted that magnetic induction accuracy for the conventional switch 91 is adversely affected when the housing 90 is at the engaging position. Moreover, the housing 90 of the switch 91 needs to be replaced if the receiving groove 93 in the fluid cylinder 92 has a different specification, thereby resulting in increased costs.

SUMMARY OF THE INVENTION

Therefore, the object of the present invention is to provide an electrical component having a housing that can be retained in different specifications of a receiving groove in a support.

According to the present invention, there is provided an electrical component adapted to be mounted on a support. The support has a surface formed with an elongated receiving groove that extends in a longitudinal direction and that is confined by a groove bottom, and opposite lateral walls connected to the groove bottom. Each of the lateral walls is formed with an elongated stop protrusion. The stop protrusions on the lateral walls cooperate to form a restricted access into the receiving groove that is opposite to the groove bottom in a transverse direction transverse to the longitudinal direction. The electrical component comprises:

a component housing adapted to be received in the receiving groove; and a retaining device including a base extending from one end of the housing, and having a first surface adapted to be disposed on the groove bottom of the receiving groove, and a second surface opposite to the first surface in the transverse direction and disposed to be spaced apart from the stop protrusions by a first distance in the transverse direction, an engaging block adapted to be confined non-rotatably in the receiving groove and having a thickness smaller than the first distance so as to be adapted to be disposed between the second surface of the base and the stop protrusions, the engaging block having a cross-section parallel to the longitudinal direction and larger than the restricted access so as to prevent removal of the engaging block from the support through the restricted access, and being formed with a through hole that extends in the transverse direction, and an elongated fastener including an operating portion, a driving rod portion connected to the operating portion and extending rotatably through the through hole in the engaging block, and a positioning rod portion connected to the driving rod portion and coupled rotatably to the base, the driving rod portion being coupled to the engaging block such that operation of the operating portion can drive the engaging block to move along the driving rod portion from a disengaging position, where the engaging block abuts against the second surface of the base and is disposed to be spaced apart from the stop protrusions in the transverse direction, to an engaging position, where the engaging block is disposed to abut against at least one of the stop protrusions and where the positioning rod portion urges the base toward the groove bottom so as to retain the housing in the receiving groove.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
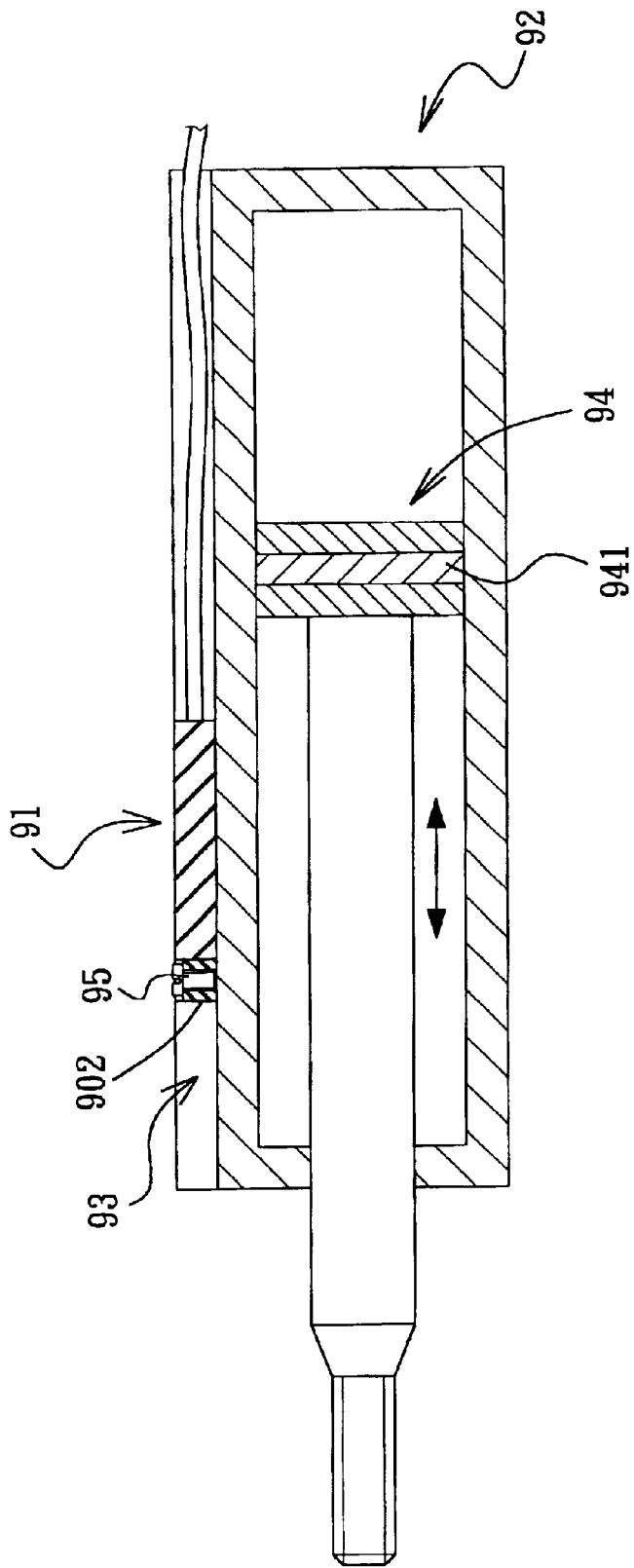
FIG. 1 is a schematic sectional view showing a conventional magnetic induction switch mounted on a fluid cylinder.
Figure 2:
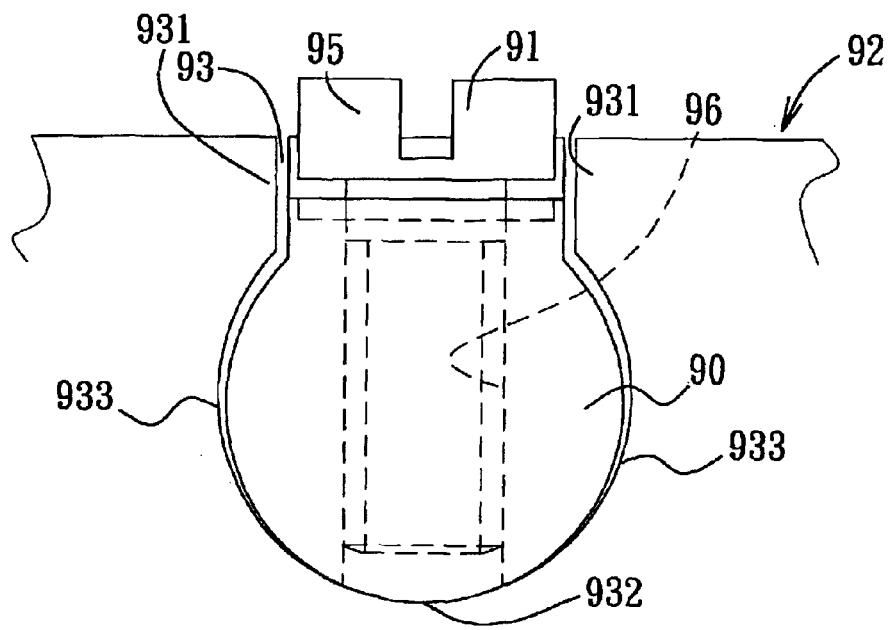
FIG. 2 is a schematic view showing the conventional magnetic induction switch when a housing thereof is at a disengaging position.
Figure 3:
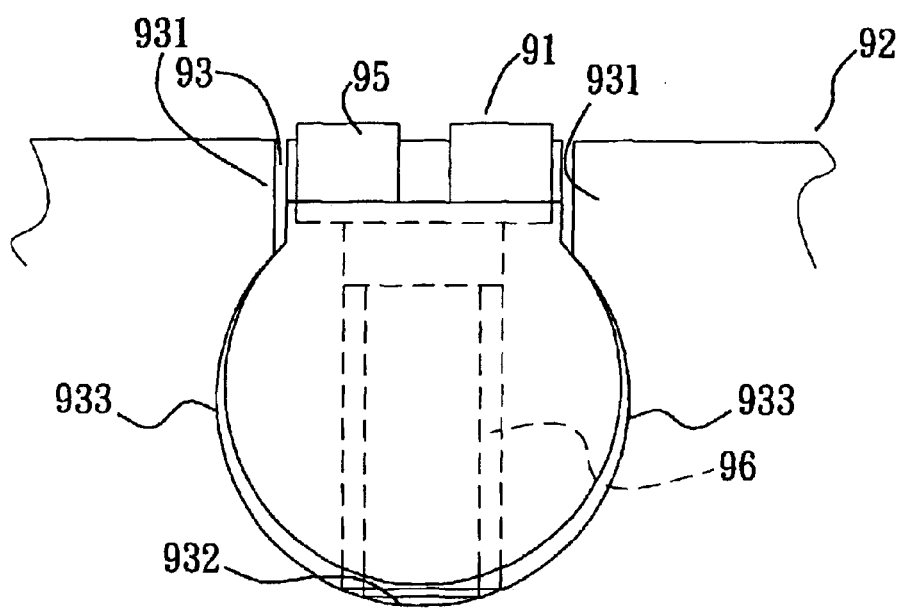
FIG. 3 is a schematic view showing the conventional magnetic induction switch when the housing is at an engaging position.

Before the present invention is described in greater detail, it should be noted that like elements are denoted by the same reference numerals throughout the disclosure.

Figure 4:
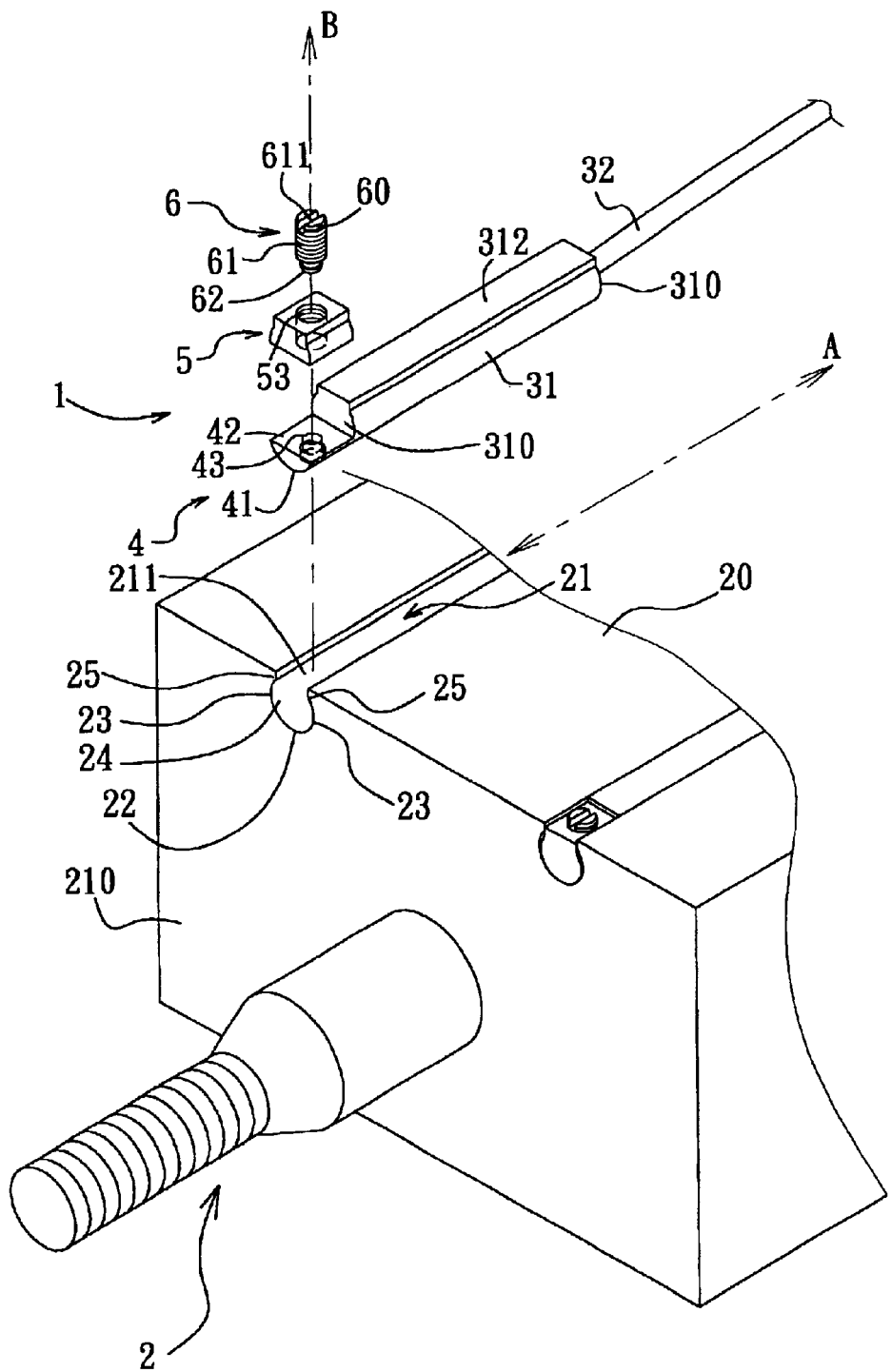
FIG. 4 is a fragmentary exploded perspective view showing the first preferred embodiment of an electrical component according to the present invention.
Figure 5:
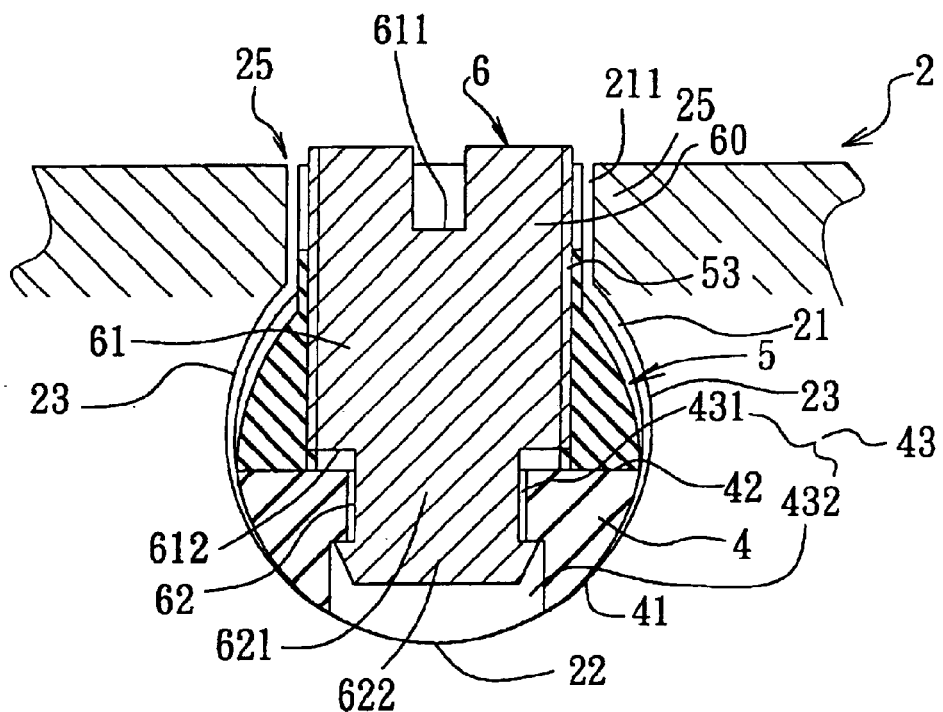
FIG. 5 is a schematic sectional view showing the first preferred embodiment when an engaging block is at a disengaging position.
Figure 6:
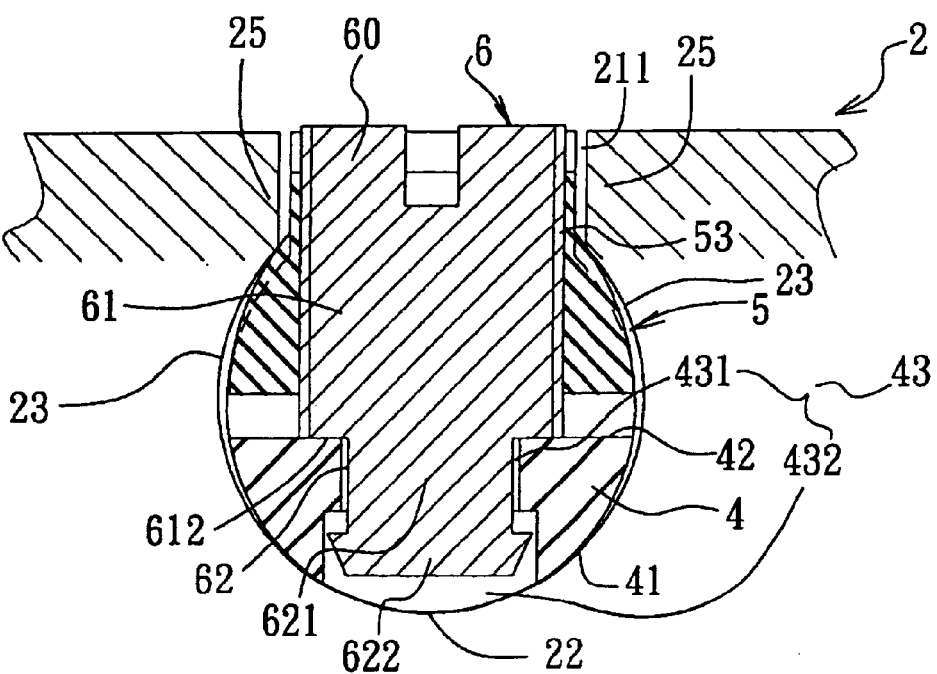
FIG. 6 is a schematic sectional view showing the first preferred embodiment when the engaging block is at an engaging position.

Referring to FIGS. 4 to 6, the first preferred embodiment of an electrical component according to the present invention is shown to be adapted to be mounted on a support. In this embodiment, the electrical component is a magnetic induction switch, and the support is a fluid cylinder 2, such as a pneumatic cylinder or a hydraulic cylinder. The fluid cylinder 2 has a surface 20 formed with an elongated receiving groove 21 that extends from one side 210 in a longitudinal direction (A) so as to thereby form an opening 24 at the side 210 and that is confined by a groove bottom 22, and opposite lateral walls 23 connected to the groove bottom 22. Each lateral wall 23 is formed with an elongated stop protrusion 25. The stop protrusions 25 on the lateral walls 23 cooperate to form a restricted recess 211 into the receiving groove 21 that is opposite to the groove bottom 22 in a transverse direction (B) transverse to the longitudinal direction (A). The magnetic induction switch 1 includes a component housing 31, and a retaining device.

The component housing 31 is adapted to be received in the receiving groove 21, and receives a plurality of electronic elements (not shown) for magnetic induction switching therein. The component housing 31 has opposite ends 310 in the longitudinal direction (A). The electronic elements are connected electrically to a power source and a control circuit (not shown) via a cable 32 extending from one end 310 of the component housing 31.

The retaining device includes a base 4, an engaging block 5, and an elongated fastener 6.

The base 4 extends from the other end 310 of the housing 31, and has an arched first surface 41 adapted to be disposed on the groove bottom 22 of the receiving groove 21, and a planar second surface 42 opposite to the first surface 41 in the transverse direction (B) and disposed to be spaced apart from the stop protrusions 25 by a first distance in the transverse direction (B). In this embodiment, the base 4 is formed with a positioning hole 43 through the first and second surfaces 41, 42. The positioning hole 43 has a small-diameter portion 431 opening at the second surface 42, and a large-diameter portion 432 opening at the first surface 41, as best shown in FIG. 5.

The engaging block 5 is adapted to be confined non-rotatably in the receiving groove 21, and has a thickness smaller than the first distance so as to be adapted to be disposed between the second surface 42 of the base 4 and the stop protrusions 25. The engaging block 5 has a cross-section parallel to the longitudinal direction (A) and larger than the restricted access 211 so as to prevent removal of the engaging block 5 from the fluid cylinder 2 through the restricted access 211, and is formed with a through hole 53 that extends in the transverse direction (B). In this embodiment, the engaging block 5 is in the form of a nut. The through hole 53 in the engaging block 5 is a threaded hole.

The fastener 6 includes an operating portion 60, a driving rod portion 61 connected to the operating portion 60 and extending rotatably through the through hole 53 in the engaging block 5, and a positioning rod portion 62 connected to the driving rod portion 61 and coupled rotatably to the base 4. The operating portion 60 has an operating surface formed with a groove 611 for engaging a screwdriver or other driving tools. The driving rod portion 61, which is in the form of a threaded rod, is coupled to the engaging block 5 such that operation of the operating portion 60 can drive the engaging block 5 to move along the driving rod portion 61 from a disengaging position, where the engaging block 5 abuts against the second surface 42 of the base 4 and is disposed to be spaced apart from the stop protrusions 25 in the transverse direction (B) (see FIG. 5), to an engaging position, where the engaging block 5 is disposed to abut against the stop protrusions 25 and where the positioning rod portion 62 urges the base 4 toward the groove bottom 22 so as to retaining the housing 31 in the receiving groove 21 (see FIG. 6). In this embodiment, the positioning rod portion 62 includes a shank section 621 connected to the driving rod portion 61, and an enlarged head section 622 connected to the shank section 621. The shank section 621 extends through the small-diameter portion 431 of the positioning hole 43 in the base 4, and has a cross-section parallel to the longitudinal direction (A) and smaller than that of the driving rod portion 61 and than the small-diameter portion 431 of the positioning hole 43 so as to form a shoulder 612 abutting against the second surface 42 of the base 4 when the engaging block 5 is at the engaging position, as shown in FIG. 6. The head section 622 has a cross-section parallel to the longitudinal direction (A) and larger than the cross-section of the shank section 621 and is retained rotatably in the large-diameter portion 432 of the positioning hole 43 in the base 4.

In actual operation, initially, the magnetic induction switch 1 is inserted slidably into the receiving groove 21 through the opening 24. The operating portion 60 of the fastener 6 is then operated using a screwdriver or the like so as to drive the engaging block 5 to move from the disengaging position to the engaging position. Therefore, the housing 31 can be firmly and evenly retained in the receiving groove 21 such that accuracy during operation of the magnetic induction switch 1 can be ensured.

Figure 7:
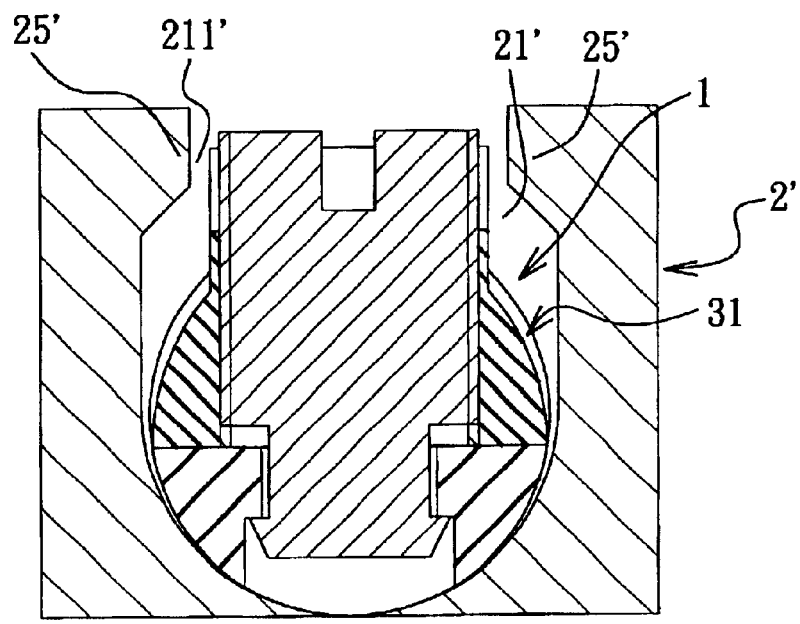
FIG. 7 is a schematic sectional view showing the first preferred embodiment in another state of use when the engaging block is at the disengaging position.
Figure 8:
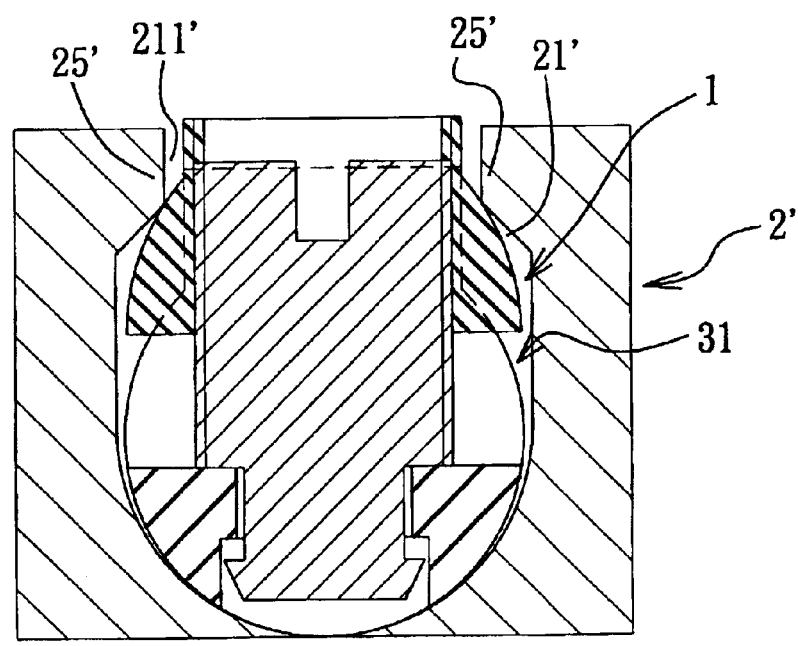
FIG. 8 is a schematic sectional view showing the first preferred embodiment in another state of use when the engaging block is at the engaging position.

Referring to FIGS. 7 and 8, in another state of use, the magnetic induction switch 1 of the first preferred embodiment is adapted to be mounted on another fluid cylinder 2' that is a modification of the above mentioned fluid cylinder 2. Unlike the previous fluid cylinder 2, the receiving groove 211' has different specifications, such as the depth and the shape of the receiving groove 21', and the stop protrusions 25'. As long as the engaging block 5 has a cross section parallel to the longitudinal direction and larger than the restricted access 211', the engaging block 5 can be driven to move from a disengaging position (see FIG. 7) to an engaging position (see FIG. 8) to retain the housing 31 in the receiving groove 21'.

Figure 9:
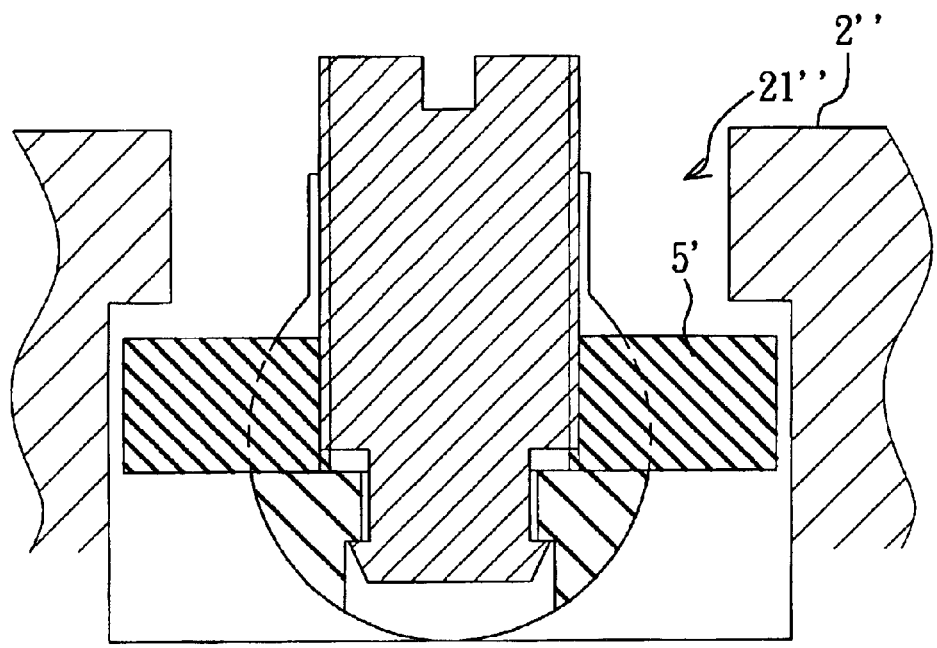
FIG. 9 is a schematic sectional view showing the second preferred embodiment of an electrical component according to the present invention when an engaging block is at a disengaging position.
Figure 10:
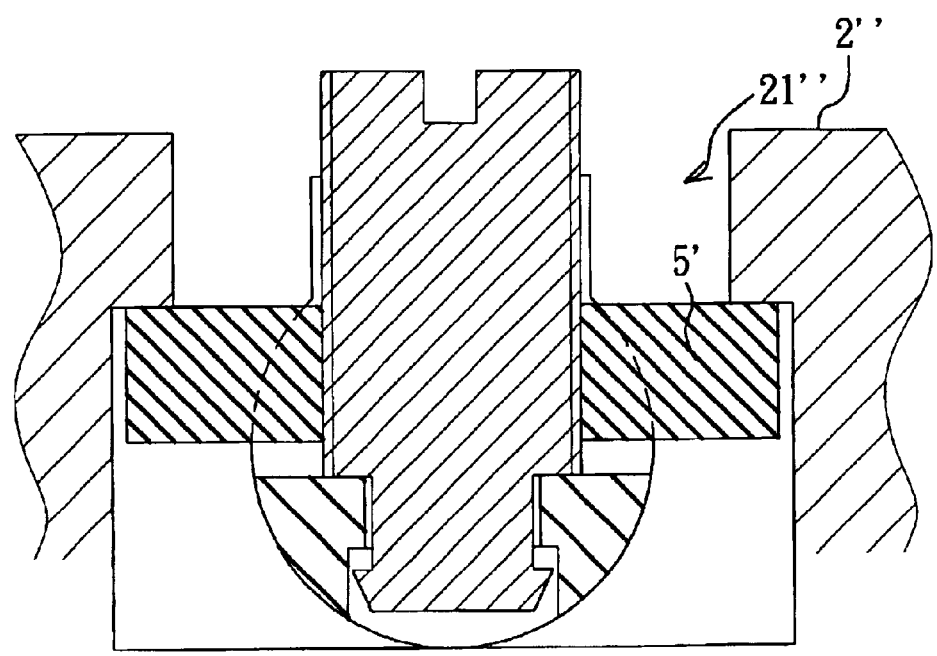
FIG. 10 is a schematic sectional view showing the second preferred embodiment when the engaging block is at an engaging position.

FIGS. 9 and 10 illustrate the second preferred embodiment of an electrical component according to this invention, which is a modification of the first preferred embodiment. Unlike the previous embodiment, an engaging block 5' larger than the engaging block 5 in the first preferred embodiment is selected for retaining the magnetic induction switch in a relatively wide receiving groove 21" of a fluid cylinder 2".

Therefore, by choosing a suitable engaging block to match the receiving groove in the fluid cylinder, the magnetic induction switch 1 of this invention can be mounted on fluid cylinders of different specifications without incurring huge costs.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An electrical component adapted to be mounted on a support, the support having a surface formed with an elongated receiving groove that extends in a longitudinal direction and that is confined by a groove bottom, and opposite lateral walls connected to the groove bottom, each of the lateral walls being formed with an elongated stop protrusion, the stop protrusions on the lateral walls cooperating to form a restricted access into the receiving groove that is opposite to the groove bottom in a transverse direction transverse to the longitudinal direction, said electrical component comprising:

a component housing adapted to be received in the receiving groove; and a retaining device including a base extending from one end of said housing, and having a first surface adapted to be disposed on the groove bottom of the receiving groove, and a second surface opposite to said first surface in the transverse direction and disposed to be spaced apart from the stop protrusions by a first distance in the transverse direction, an engaging block adapted to be confined non-rotatably in the receiving groove and having a thickness smaller than the first distance so as to be adapted to be disposed between said second surface of said base and the stop protrusions, said engaging block having a cross-section parallel to the longitudinal direction and larger than the restricted access so as to prevent removal of said engaging block from the support through the restricted access, and being formed with a through hole that extends in the transverse direction, and an elongated fastener including an operating portion, a driving rod portion connected to said operating portion and extending rotatably through said through hole in said engaging block, and a positioning rod portion connected to said driving rod portion and coupled rotatably to said base, said driving rod portion being coupled to said engaging block such that operation of said operating portion can drive said engaging block to move along said driving rod portion from a disengaging position, where said engaging block abuts against said second surface of said base and is disposed to be spaced apart from the stop protrusions in the transverse direction, to an engaging position, where said engaging block is disposed to abut against at least one of the stop protrusions and where said positioning rod portion urges said base toward the groove bottom so as to retain said housing in the receiving groove.

2. The electrical component as claimed in claim 1, wherein said driving rod portion is in the form of a threaded rod, and said through hole in said engaging block is a threaded hole.

3. The electrical component as claimed in claim 1, wherein said base is formed with a positioning hole through said first and second surfaces, said positioning hole having a small-diameter portion opening at said second surface, and a large-diameter portion opening at said first surface, said positioning rod portion of said fastener including a shank section connected to said driving rod portion, and an enlarged head section connected to said shank section, said shank section extending through said small-diameter portion of said positioning hole and having a cross-section parallel to the longitudinal direction and smaller than that of said driving rod portion and than said small-diameter portion of said positioning hole so as to form a shoulder abutting against said second surface of said base when said engaging block is at the engaging position, said head section having a cross-section parallel to the longitudinal direction and larger than the cross-section of said shank section and being retained rotatably in said large-diameter portion of said positioning hole.

* * * * *